United States Patent [19]
Verbakel

[11] 3,956,794
[45] May 18, 1976

[54] DEVICE FOR SEVERING THE HEAD FROM THE NECK OF SLAUGHTERED POULTRY

[75] Inventor: Godefriedus Hendrikus Waltherus Verbakel, Helmond, Netherlands

[73] Assignee: Stork-Brabant B.V., Boxmeer, Netherlands

[22] Filed: May 24, 1974

[21] Appl. No.: 473,302

[30] Foreign Application Priority Data
June 12, 1973   Netherlands...................... 7308161

[52] U.S. Cl. .................................................. 17/12
[51] Int. Cl.² ........................................ A22C 21/00
[58] Field of Search............................ 17/12, 11, 45

[56] References Cited
UNITED STATES PATENTS
3,277,514   10/1966   Hooley................................ 17/12 X
3,514,809   6/1970   Barbour et al.......................... 17/12
3,765,055   10/1973   Lewis.................................. 17/12 X Primary Examiner—Richard C. Pinkham
Assistant Examiner—William R. Browne
Attorney, Agent, or Firm—Edmund M. Jaskiewicz

[57] ABSTRACT

Device for severing the head from the neck of slaughtered poultry which, hanging by its legs, is moving on a conveyor track, comprising two oblong guides provided with edges facing each other and being disposed at a short distance from each other, the guides extending in the direction of transport. The plane through said edges diverges in the direction of transport with respect to the level of the conveyor track. Underneath the guides a conveyor member is arranged for displacing the severed head in the direction of transport.

2 Claims, 5 Drawing Figures

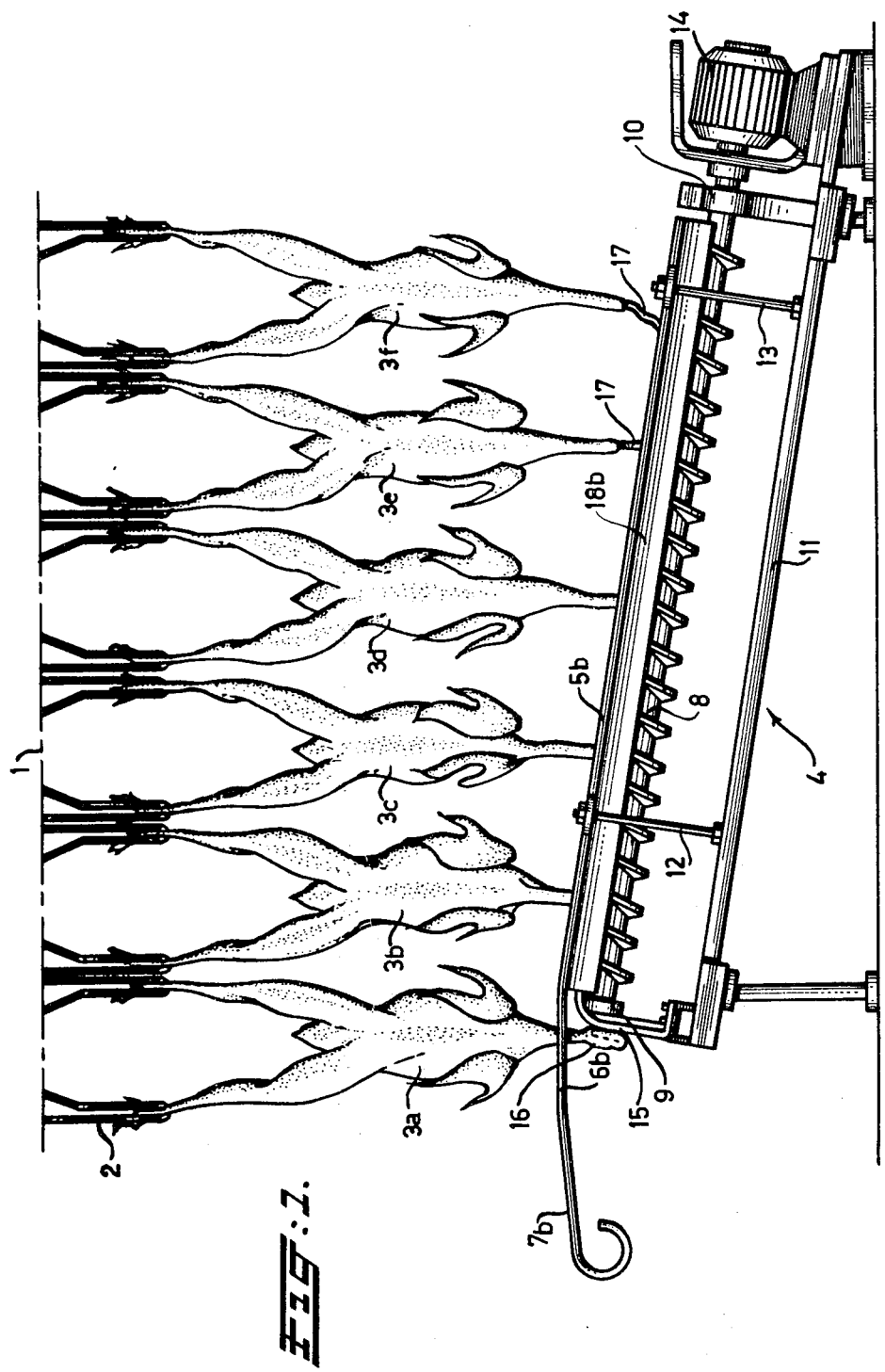

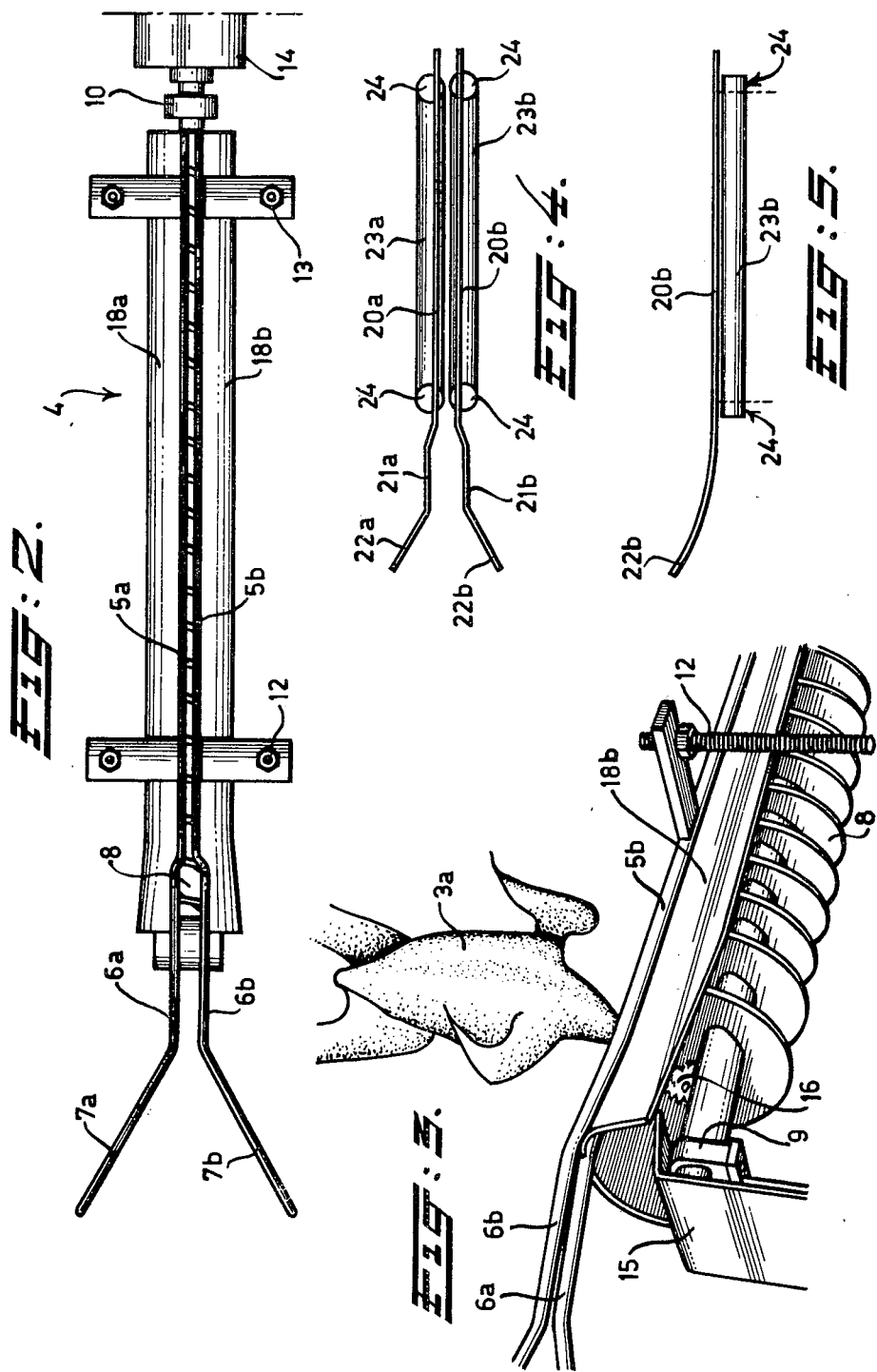

DEVICE FOR SEVERING THE HEAD FROM THE NECK OF SLAUGHTERED POULTRY

BACKGROUND OF THE INVENTION

My invention relates to a device for severing the head from the neck of slaughtered poultry which, hanging by its legs, is moving on a conveyor track, comprising two oblong guides which extend in the direction of transport in such a way that their edges facing each other are at a short distance from one the other, the plane through the edges diverging in the direction of transport with respect to the level of the conveyor track.

Such a device is known per se. In these known devices the birds the neck of which is cut into at a particular location, are introduced by their head inbetween the guides. Since the plane of the guides diverges with respect to the level of the conveyor track and the head together with the jaws is retained behind the guides, the head, with the tendons connected therewith, is pulled from the neck.

This known device has the drawback that this pulling loose is not done uniformly and at the same location, owing to the fact that the friction between the heads and the guides is not constant, so that the heads get more or less stuck between the guides. The birds move jerkily along the guide rods and frequently a number of birds accumulate at the beginning of the device. Often obstructions occur since the heads with wind pipes and gullets remain hanging between the guides. It occurs often that the head turns through an angle e.g. 90° against the direction of transport whereby the bill is torn off. Then the gullet tears off at the location of the tongue instead of by the crop, as is desired, while also the wind pipe tears off there instead of by the lungs. All this results in that a product is obtained which as regards the quality, does not quite measure up to accepted standars and which has a worse appearance.

SUMMARY OF THE INVENTION

My invention aims to eliminate this drawback. This is attained by such an arrangement that a conveying member is disposed under the guides, which serves to displace the head in the direction of transport.

This conveying member ensures that the heads of the birds are uniformly moved in the desired position along the guide rods, so that the aforementioned undesired symptoms do not occur.

Due to the conveying member the head remains relating to the neck, between the member and one of the guides, whereby not the part of the head which directly adjoins the jaws, but the larynx lies between the guides.

As a consequence a constant pressure is exerted on the throat and an untimely tearing off of gullet and wind pipe by the tongue is avoided. These parts are now torn off by the crop and the lungs, respectively.

It has been found that, when using the device according to my invention all the heads are severed from the neck at the same location and a product with a better eye appeal is obtained.

The conveying member is preferably a screw which is driven in rotation and the axis of the guide screw lies substantially in the vertical symmetry plane of the guides. This is advantageous in that the device can be adapted by relating the direction of rotation of the screw to the direction of transport of a particular production line. Each of the guides consists preferably of a rod to which is adjoined a curved guard plate.

SURVEY OF THE DRAWINGS

In the drawing:

FIG. 1 is a side elevation of the device according to the invention;

FIG. 2 is a plan view of such a device;

FIG. 3 is a perspective view of the part of the device adjacent the input;

FIG. 4 represents diagrammatically a plan view of an embodiment in which the conveying member consists of two driven belts moving in opposite directions.

FIG. 5 is a side elevation of this embodiment.

DESCRIPTION OF PREFERRED EMBODIMENTS

FIG. 1 shows the diagrammatically represented conveyor track 1 with the shackles 2 moving therealong from which the birds 3a–3f are suspended by their legs. The device according to the invention, denoted as a whole by the reference numberal 4, is arranged thereunder; this device comprises two rod-shaped guides 5a, 5b (see FIG. 2) which are situated at a short distance from each other, at the lefthand end (input) the parts 6a, 6b, 7a, 7b adjoin the guides, the distance between the aforementioned parts is greater, increases gradually respectively. The distance of the parts 5a, 5b from the level of the conveyor track 1 increases gradually as in the analogous known devices, so that, when a bird by the neck is introduced inbetween the guides and the head is below the level of the guides, the neck is torn off from the head when the bird is moved along the conveyor track.

In the embodiment of the device according to my invention which is shown in the drawing, a guide screw 8 is disposed underneath the level of the guides 5a, 5b. The axis of the screw is substantially situated in the symmetry plane of the guides and its ends are supported in bearings 9, 10 which are supported by the frame 11 which via the supporting rods 12, 13 supports likewise the guide rods. The guide screw is driven at a suitable speed of rotation by the electric motor 14. This speed of rotation and the pitch of the screw 8 are selected in such a way that when the bird is moving along the conveyor track 1, the head of the bird is moved at the same speed in the same direction.

At the input end is a curved guide plate 15 which ensures that the head 16 of the bird is introduced into the helix.

The head of the bird is, due to the presence of the screw, bent about one of the guide rods — in this case the guide rod 5a, — so that the larynx is situated between the guide rods 5a, 5b. Thus the same part of the neck of the birds is always situated between the guide rods and also due to the uniform guide of the head, it is achieved that the head with tendons adhering thereto is uniformly pulled loose from the neck, while the gullet and wind pipe are pulled loose from the crop, lungs, respectively and at the beginning of the device the birds do not accumulate.

FIG. 1 shows the various stages. The bird 3a is about to be introduced inbetween the guides 5a, 5b. In the situation as shown in the figure the gullet and the wind pipe 17 of the bird 3e are already partially loose; these parts are entirely pulled loose in case of the bird denoted by 3f.

With each of the guides 5a, 5b is connected a bent guard plate 18a, 18b so that the worm conveyor 8 is partially confined.

FIGS. 4 and 5 show in plan view, side elevation, respectively an embodiment in which the conveying member consists of two guide belts. This embodiment comprises two guides 20a, 20b, with the input parts 21a, 21b, 22a, 22b. Under these parts are disposed two guide belts 23a, 23b, slung over rollers 24 and synchronously driven with the conveyor track for the birds. The guide belts are disposed at an angle with a vertical longitudinal plane through the device.

The aforementioned advantages are also obtained with this embodiment.

What I claim is:

1. A device for removing the head from the neck of slaughtered poultry as the poultry is advanced along a direction of transport suspended from a substantially horizontal conveyor, comprising a pair of elongated guide members having spaced opposed edges to receive the neck of the poultry therebetween and the head being below said guide member edges, and means for displacing and diverging the neck of the poultry in the direction of transport such that the head is pulled loose from the neck at a particular location of the guide members with respect to a horizontal poultry advancing conveyor, said means comprising said guide member edges diverging in the direction of transport away from a horizontal conveyor advancing the poultry such that the distance between such a conveyor and said pair of guide members gradually increases, said guide members continuing throughout the length of travel of the head of poultry during the removal process, said means further comprising a conveyor screw beneath said spaced guide member edges and rotatable to displace the head of the poultry.

2. A device according to claim 1, wherein the axis of the guide screw lies substantially in a vertical plane positioned symmetrically between said guide members.

* * * * *